United States Patent
Srinivasan et al.

(10) Patent No.: US 11,765,155 B1
(45) Date of Patent: Sep. 19, 2023

(54) ROBUST AND SECURE UPDATES OF CERTIFICATE PINNING SOFTWARE

(71) Applicant: Amazon Technologies, Inc., Seattle, WA (US)

(72) Inventors: Preethi Srinivasan, Sterling, VA (US); Dheeraj Kumar Mekala, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 17/037,491

(22) Filed: Sep. 29, 2020

(51) Int. Cl.
*H04L 9/40* (2022.01)
*G06F 8/65* (2018.01)
*G06F 9/455* (2018.01)

(52) U.S. Cl.
CPC ............ *H04L 63/0823* (2013.01); *G06F 8/65* (2013.01); *G06F 9/45558* (2013.01); *H04L 63/0435* (2013.01); *H04L 63/1466* (2013.01); *G06F 2009/45583* (2013.01); *G06F 2009/45595* (2013.01)

(58) Field of Classification Search
CPC ............. H04L 63/0823; H04L 63/0435; H04L 63/1466; G06F 8/65; G06F 9/45558; G06F 2009/45583; G06F 2009/45595
See application file for complete search history.

(56) References Cited

U.S. PATENT DOCUMENTS

| 6,976,163 | B1* | 12/2005 | Hind ..................... G06F 21/572 |
| | | | 713/1 |
| 8,782,434 | B1 | 7/2014 | Ghose |
| 9,767,271 | B2 | 9/2017 | Ghose |
| 9,847,992 | B2 | 12/2017 | Zaw et al. |
| 10,211,992 | B1 | 2/2019 | Tarandach |
| 2016/0366112 | A1* | 12/2016 | Gropper ............. H04L 63/0823 |
| 2019/0014115 | A1 | 1/2019 | Bronshtein et al. |
| 2019/0165950 | A1* | 5/2019 | Ibrahim ............... H04L 9/3268 |
| 2022/0179640 | A1* | 6/2022 | Fassino ................ H04L 63/123 |
| 2022/0405392 | A1* | 12/2022 | Nix ........................ H04L 9/3252 |

* cited by examiner

*Primary Examiner* — Mohammad W Reza
(74) *Attorney, Agent, or Firm* — Robert C. Kowert; Kowert, Hood, Munyon, Rankin & Goetzel, P.C.

(57) ABSTRACT

Systems and methods are disclosed to implement an application that can automatically download new digital certificates to verify signed code updates received by the application. In embodiments, under normal circumstances, the application uses a pinned certificate in the application's executable code to verify received updates signed using the certificate. However, if the code signing certificate changes, the application will automatically retrieve the new certificate from a certificate publishing service. Accordingly, the new certificate does not have to be included as part of the code update package, and the retrieval of the new certificate can be managed more robustly by the application updater. In embodiments, downloads from the certificate publishing service may be secured using a nonce and a shared secret that is known to the service and also pinned to the application. In this way, the download process can be protected from hijacking attacks.

20 Claims, 10 Drawing Sheets

ROBUST AND SECURE UPDATES OF CERTIFICATE PINNING SOFTWARE

BACKGROUND

Certificate pinning is the practice of hardcoding a copy of a digital certificate into the executable code of a verifier of the certificate. For example, certificate pinning may be used to authenticate software signed using a software provider's public key. A code verifier may use the pinned certificate and its associated public key to verify whether the software originated from a trusted provider. Certificate pinning is generally used to mitigate hijacking attacks where an intermediary server hijacks the communication between two computing systems by using a false certificate. In code verification applications, certificate pinning limits an attacker's ability to introduce malicious code into a code execution system.

Certain types of software may use pinned certificates to verify code updates from the software provider. Such software must be periodically updated when the certificate of the software provider changes, for example, when the certificate expires or rotates to a different certificate based on a security policy. However, this process of updating the software can be error prone, especially where the team publishing the update is not aware of the certificate change. An error during this critical update could result in the total breakdown of the software updating process, or worse, cause the verification of the new certificate to be bypassed. A better solution is needed to push software updates involving certificate changes to ensure that the updates are performed in a robust and secure manner.

Figure 1:
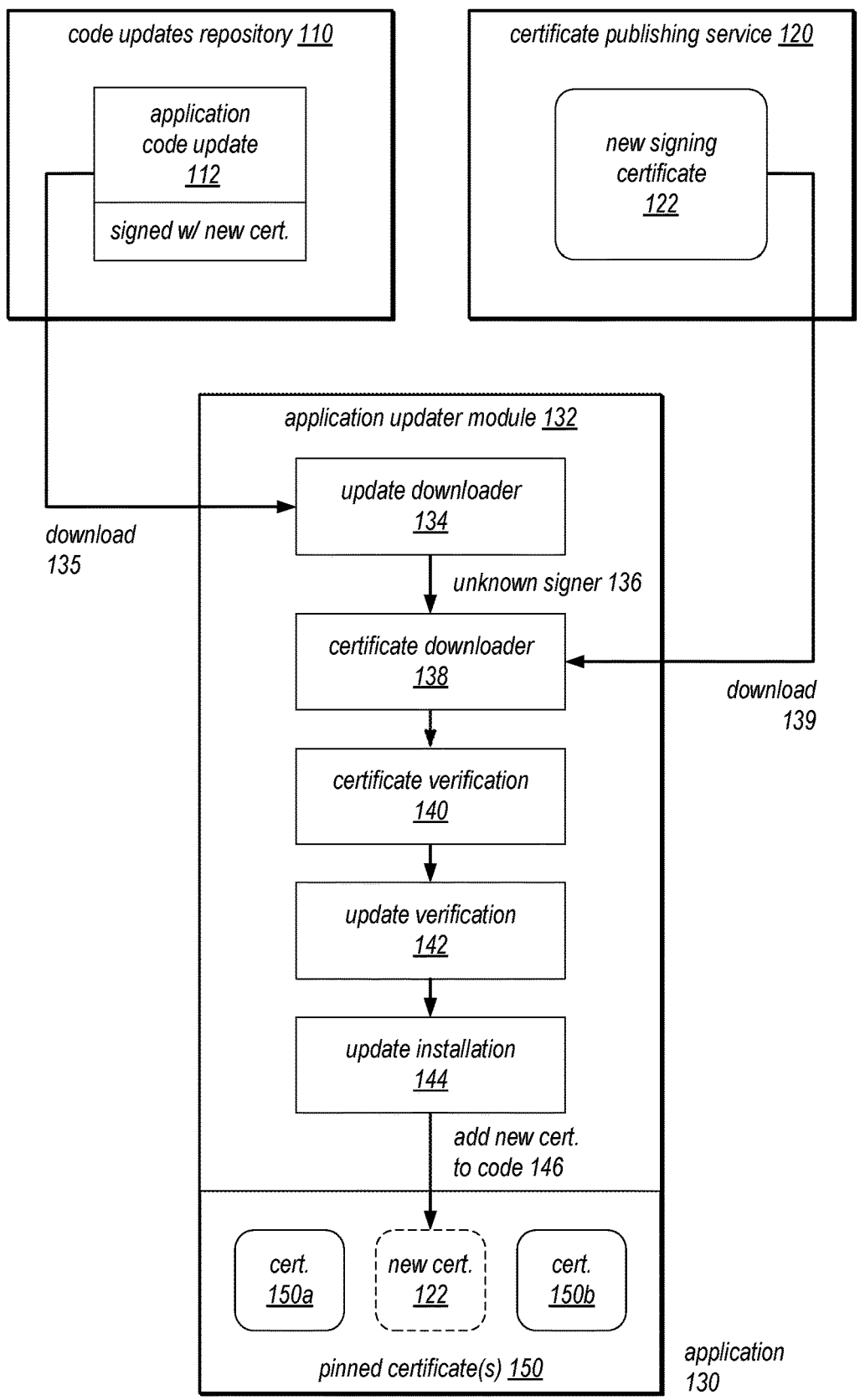
FIG. 1 is a block diagram illustrating an application that is capable of verifying signed code updates using a pinned certificate and downloading a new certificate from a certificate publishing service when the signing certificate changes, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Systems and methods described herein may be employed in various combinations and in embodiments to implement a software update system (e.g. a self-updating application) that is capable of verifying signed code updates using a pinned certificate and downloading a new certificate from a certificate publishing service when the signing certificate changes.

Certain types of software may use pinned certificates to verify code updates from the software provider. Such software must be updated when the certificate of the software provider changes, for example, when the certificate expires or rotates to a different certificate based on a security policy. The update process typically involves pushing an update to the software signed using the old certificate, along with the new certificate, which will be verified by the software. However, this process can be error prone, especially where the team publishing the update is not aware of the certificate change, which may be managed by a different team. An error during this critical update could result in the total breakdown of the software updating process, or worse, cause the verification of the new code signing certificate to be bypassed. One problem with the conventional approach lies in the fact that the code signing certificate is pinned to the application itself (e.g. hardcoded in the executable code of the application or packaged with the executable code). The pinning mandates that a new release of the application be distributed whenever the code signing certificate changes.

Accordingly, to address these and other problems in the state of the art, embodiments of a software updating system are disclosed that automatically retrieves a new code signing certificate from a certificate publishing service, independently from the code updates. For example, instead of including the new certificate as part of a new release of an application, the new certificate is provided to a certificate publishing service to be downloaded by the application at its convenience. Accordingly, the application does not need to be updated whenever the code signing certificate is changed; it has the option of verifying an update using an external certificate. Moreover, the application does not have to rely on the code update package to supply the correct certificate. Rather, the application is programmed with the intelligence to securely retrieve the new certificate from a certificate publishing service, when it is needed. In this manner, the disclosed technique enhances the robustness of software update processes that use pinned certificates to verify code updates.

In some embodiments, an application performing an update may be configured to detect that a received code update is signed using an unknown certificate, which does not match any of the application's pinned certificates. When this occurs, the application will automatically retrieve the new certificate from the certificate publishing service. In some embodiments, the downloading process may be secured from hijacking attacks using a nonce and a shared secret between the application and the service. For example, the application and the service may share a secret key, which is pinned in the executable code of the application. The application will send the nonce to the service along with its download request, and the service will return a response that includes an encrypted value of the nonce computed using the key. The application will regenerate the encrypted value using its own copy of the key, which will be matched against the server's encrypted value to verify the authenticity of the response. Advantageously, use of the pinned secret in this fashion protects the certificate downloading process from certain types of third-party hijacking attacks.

In some embodiments, the certificate publishing service may be implemented in a service provider network that provides computing resource services for clients over one or more networks, including public networks. The service provider network may provide a variety of platform services that may be used to implement components of client computing system hosted by the service provider network. In some embodiments, the certificate publishing service may include a service interface that is implemented using an interface gateway service of the service provider network. In some embodiments, the certificate publishing service may employ one or more task execution nodes that are implemented by an event-driven task execution service of the service provider network. In some embodiments, the certificate publishing service may implement a certificate repository that is implemented by an object storage service of the service provider network. In some embodiments, the service provider network may implement a virtual machine (VM) hosting service that hosts virtual machines on behalf of clients, and the application may be an inspector agent deployed on the virtual machines to collect information about the virtual machines.

As will be appreciated by those skilled in the art, the disclosed techniques improve the functioning of conventional software updating systems that verify code updates using pinned certificates. The disclosed update process decouples code updates from the rare updating of the code signing certificate, by allowing the updating application to retrieve the new certificate on its own. The decoupling of these two types of updates simplifies the update process in the event of certificate changes, and makes the process more robust and secure. These and other features and benefits of the disclosed software update system are described in further detail below, in connection with the figures.

FIG. 1 is a block diagram illustrating an application that is capable of verifying signed code updates using a pinned certificate and downloading a new certificate from a certificate publishing service when the signing certificate changes, according to some embodiments.

As shown, the figure depicts an application 130 that is configured to download 135 an application code update 112 from a code update repository 110 and install the update within its own codebase. In some embodiments, the application code update 112 may be self-executable, for example, one or more WSI installer packages executable on the WINDOWS platform. The installation of the code update 112 may be performed by executing the installer packages.

As shown, the downloading 135 of the code update 112 may be performed by an update downloader component 134 of the application 130. In some embodiments, the application 130 may be self-updating, and implement an application updater module 132 to perform updates on itself. The application update module 132 may be implemented as part of an updater service that periodically wakes up to check the code updates repository 110 for available code updates. In some embodiments, the application update module 132 may be configured to receive update pushes from a code publication service, or notifications about newly available code updates. In some embodiments, the application update process may be initiated manually by a user. For example, the update process may be initiated in response to one or more user commands received via a software management interface. In some embodiments, the update process may be initiated after a user approval input received from a GUI prompt. The application updater 132 may initiate downloading of the code update in response to such received user input. In some embodiments, the code updates repository may be a file system folder located at a known location (e.g. an FTP server) that is accessible to the application.

As shown, in some embodiments, the code update 112 is signed using a digital certificate (here new signing certificate 122). The digital certificate may be an X.509 certificate that is issued to an entity, for example, the provider of the application 130 and/or the code update 112. The certificate may include a public key of the entity, which corresponds to a private key held by the entity. To sign the code update, a hash of the update is computed, and the hash is encrypted using the entity's private key. The signature can later be verified by decrypting the encrypted hash, and verifying that the hash is equal to a new hash computed from the update. If the two hashes are equal, it proves that (a) the signature originated from the purported entity, and (b) the contents of the update have not changed since the signing.

As shown in this example, the application 130 initially determines 136 that the new certificate used to sign the code update (new signing certificate 122) is not known to the application. For example, it may be determined that the code update 112 cannot be verified using any of the certificates 150 pinned to the application (e.g. hardcoded in the executable code of the application). This situation may arise if the certificate of the signing entity changes, for example, due to expiration of the previous certificate, or as a result of a certificate rotation mandated by a security policy. In this example, the code update 112 may include the new certificate 122 and applying the update will pin or add 146 the new certificate to the application. However, the application updater 132 cannot install the code update without first verifying the authenticity of the update.

As shown, in some embodiments, the application 130 may implement a certificate downloader 138. The certificate downloader 138 may be tasked with downloading 139 the new certificate 122 from a known certificate publish service 120. In some embodiments, the access details of the service 120 is hardcoded into the application 130. For example, the application may be hardcoded with a specific network address of the certificate publishing service 120, and be programmed to access the service using an invocation interface (e.g. an API) of the service. As shown, the certificate publishing service 120 in this example holds a copy of the new certificate 122. In some embodiments, the new certificate 122 is hosted by the service 120 separately from the code update 112, so that the two can be retrieved separately by the application updater 132. By storing the code update 112 and the signing certificate 122 separately, the system allows the application updater 132 to decide on its own when to retrieve the two items. This flexibility relieves the update release team from (1) having to create new releases of the application specifically to change the certificate, and (2) packaging the correct certificate as part of the release package. Instead, the application updater 132 is enhanced with the ability to retrieve the new certificate 122 when it is needed.

As shown, in some embodiments, a newly downloaded certificate will be verified using a certificate verification module 140. Verifying the certificate will ensure that the certificate is the authentic certificate of the software provider. This verification is an important step because the new certificate will be used to not only verify the code update 112, but also subsequent code updates pushed to the application. The certificate verification may be performed using other certificates in a chain of trust, which may also be pinned to the application. For example, the new certificate may be verified if it is determined that it is signed by another trusted certificate in the chain. In some embodiments, the application updater 132 may be configured to repeatedly download parent certificates higher in the chain of trust from the certificate publishing service 120, until the chain can be established to a trusted root certificate. If the new certificate 122 cannot be verified by the certificate verification component 140, it will not be used in any further steps by the application updater 132, and in some embodiments, a verification error may be logged or reported.

As shown, in some embodiments, once the new certificate 122 is verified by the certificate verification module 140, it is used by an update verification module 142 to verify the code update 122. As discussed, the code update verification may be performed by decrypting a hash of the code update using a public key associated with the new certificate, and then comparing the decrypted hash to a new hash recomputed from the code update. If the two hashes match, the code update will be verified as authentic. In some embodiments, multiple certificates may be used to attempt verification of the code update. If the code update cannot be verified, the application update 132 will not apply the update to the application 130, and an error may be logged or reported.

As shown, in some embodiments, after the update is verified by the update verification module 142, it is installed in the application 130 so that the next launch of the application will include the changes implemented by the update. As discussed, in some embodiments, the code update 112 may be implemented as an executable, which will unpackage and copy the necessarily files for the application into their destination locations in the file system hierarchy, and also make any necessarily configuration changes on the host (e.g. in the WINDOWS registry). As shown, the installation process may add or pin the new certificate 122 to the application 130. As shown, in some embodiments, the application 130 may have a number of pinned certificates 150, which may be used for different purposes including code update verification.

Figure 2A:
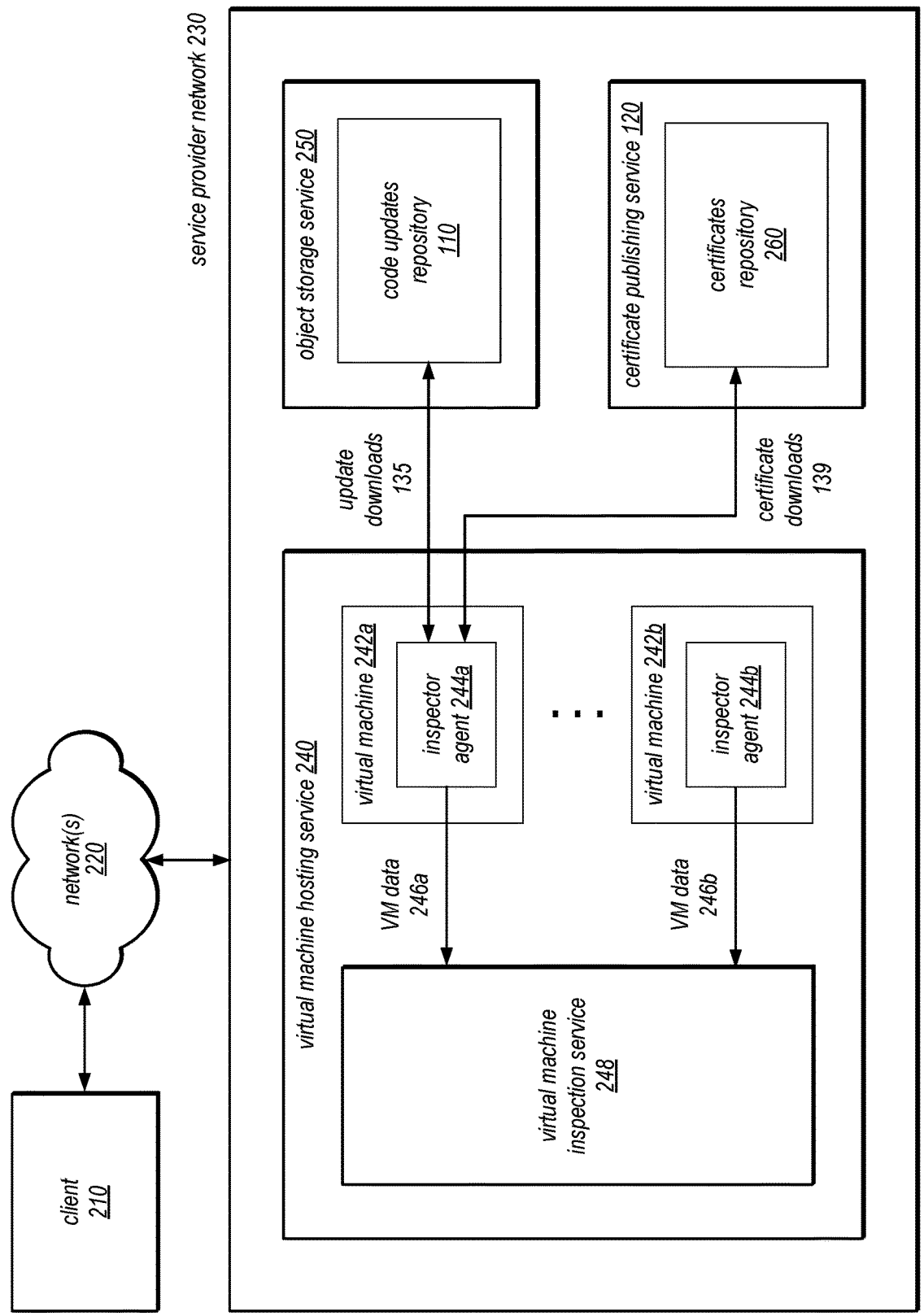
FIG. 2A is a block diagram illustrating a service provider network that implements an inspector agent that downloads new certificates from a certificate publishing service, according to some embodiments.

FIG. 2A is a block diagram illustrating a service provider network that implements an inspector agent that downloads new certificates from a certificate publishing service, according to some embodiments.

As shown, the figure depicts a client 210 interacting with service(s) provided by a service provider network 230 over one or more networks 220. In some embodiments, client 210 may be a client computer system executing a web browser. The web browser may be used to interact with one or more services provided by the service provider network 230. In some embodiments, the client 210 may implement a client application that is configured to make programmatic calls over an API to a service provided by the service provider network 230.

In various embodiments, the network(s) 220 may encompass any suitable combination of networking hardware and protocols necessary to establish network-based communications between clients 210 and the service provider network 230. In some embodiments, the network 220 may include a public network such as the Internet. In some embodiments, the network may include private networks such as local area networks (LANs) or wide area networks (WANs) operated by a private entity. In some embodiments, the network may include various hardware (e.g., modems, routers, switches, load balancers, proxy servers, etc.) and software (e.g., protocol stacks, firewall/security software, etc.) needed to establish a networking link between clients and the service provider network 230. In some embodiments, the client and the service provider network 230 may be respectively provisioned within enterprises having their own internal networks. In such embodiments, the network 220 may include the hardware (e.g., modems, routers, switches, load balancers, proxy servers, etc.) and software (e.g., protocol stacks, accounting software, firewall/security software, etc.) necessary to establish a networking link between the clients and the Internet as well as between the Internet and service provider network.

As shown, the service provider network 230 provides a number of services to the client 210, which may provide computing resources to the clients, such as virtual machines hosted in a virtual machine hosting service 240, or storage space hosted in an object storage service 250. In some embodiments, some service provider networks may provide a web interface that allows the clients 210 to configure and/or manage the computing resources provided by the service provider network.

As shown, in some embodiments, a virtual machine hosting service 240 is configured to host, using physical servers in the service provider network, a number of virtual machines (e.g. VMs 242a and 242b) on behalf of clients. In some embodiments, the virtual machine hosting service 240 may implement a virtual machine inspections service 248, which may be configured to collect VM data (e.g. VM data 246a and 246b) from the virtual machines. Depending on the embodiment, such VM data may include operational data, operational metrics, health metrics, usage data, and the like. As shown, in some embodiments, the data collection may be performed using inspector agents (e.g. agents 244a and 244b) deployed on the VMs. In some embodiments, these inspector agents may be the application 130 of FIG. 1. The inspector agents 244 may periodically download or receive code updates 112 from a code updates repository 110 and verify the updates using pinned certificates. As may be appreciated by those skilled in the art, these agents 244 may be deployed on a large number of virtual machines in the service provider network. Accordingly, when a code signing certificate is changed, it is critical that the agents correctly verify and add the new certificate, so that they can continue to receive code updates.

As shown, the service provider network 230 implements an object storage service 250 to implement the code updates repository 110. The inspector agents 244 may periodically check for and download 135 code updates pushed to the code updates repository. Additionally, the service provider network 230 implements the certificate publishing service 120, which implements a certificates repository 260. The inspect agents 244 may periodically check for and download 139 new code signing certificates from the certificates repository. As discussed, the two repositories 110 and 260 are implemented separately so that code updates and code signing certificates can be downloaded separately. The decoupling of these two types of data allow the inspector agents 244 to handle occasional changes of the code signing certificate more robustly.

Figure 2B:
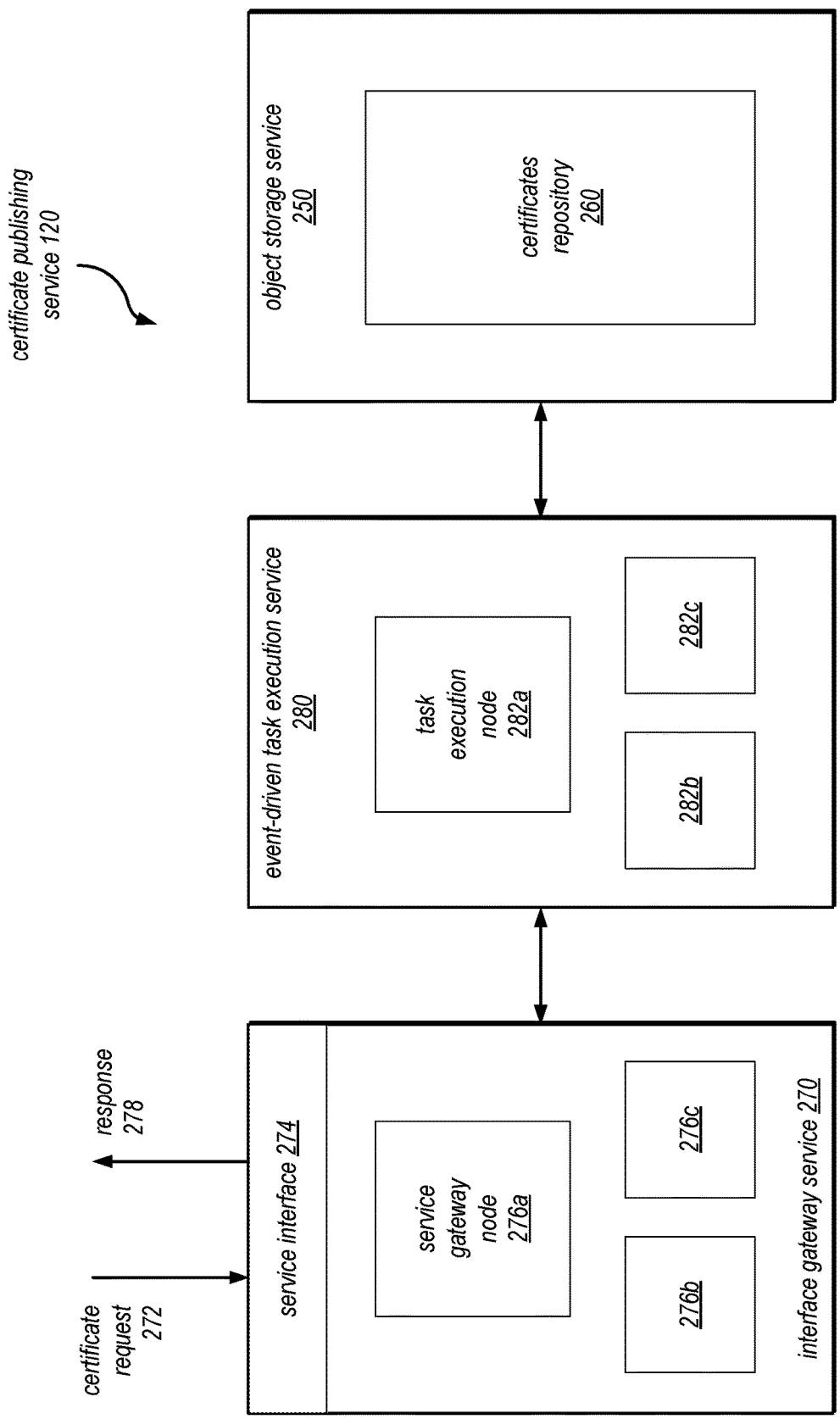
FIG. 2B is a block diagram illustrating components of a certificate publishing service, according to some embodiments.

FIG. 2B is a block diagram illustrating components of a certificate publishing service, according to some embodiments. The figure depicts an embodiment of the certificate publishing service 120 of FIG. 1.

As shown in this example, the certificate publishing service is implemented on top of three computing resource services: an interface gateway service 270, and an event-driven task execution service 280, and an object storage service 250. In some embodiments, these computing resources services may be provided by the service provider network 230 of FIG. 2A.

In some embodiments, the interface gateway service 270 is configured to provide custom service interfaces (e.g. RESTful or WebSocket interfaces) for client services hosted in the service provider network. The service interface 274 in this case may be configured to accept certificate requests 272 from application updaters, and provide responses 278 that include the requested certificates, if found. In some embodiments, the certificate publishing service 120 retrieves the newest code signing certificate depending on the parameters of the request 272 and/or the type of requestor. In some embodiments, incoming certificate requests 272 may be handled by one of a pool of service gateway nodes 276*a-c*. These gateway nodes 276 may be responsible for marshalling and unmarshalling request and response data, encrypting and/or decrypting the requests and responses, and performing certain security functions such as prevention of denial-of-service attacks. In some embodiments, the interface gateway service 270 may automatically scale the pool of gateway nodes 276*a-c* based on the level of service demand, so that more gateways nodes are provisioned when a spike in requests is observed, and fewer gateway nodes are maintained when the request volume is low. In some embodiments, the gateway nodes may be implemented as virtual machines or container instances hosted by the service provider network 230.

As shown, the interface gateway service 270 is configured to interact with an event-driven task execution service 280 to forward the request handling tasks to task execution nodes 282*a-c*. In some embodiments, the task execution nodes 282 belong to a global pool of available task execution nodes that can be quickly deployed to handle a custom task specified by the task owner. In some embodiments, these tasks may be implemented as serverless tasks, in that they are not assigned to any dedicated task execution nodes. Rather, the execution nodes for these tasks may be provisioned on demand, or on an event-driven basis. In this manner, the event-driven task executions service is able to support a large number of tasks using relatively few task execution nodes (e.g. virtual machine or container instances). In this example, the task execution nodes 282*a-c* may be configured to perform tasks such as retrieving a certificate for a request 272, and returning the certificate to the service gateway node 276. In some embodiments, the task execution node 282 may perform adjunct tasks such as to add additional data to the response to enhance the security of the communication between the application updater and the service. One example of such a security measure is discussed in connection with FIG. 4.

As shown, the event-driven task execution service 280 is configured to access the object storage service 250, which may be used here to implement the certificates repository 260. In some embodiments, the object storage service 250 may store objects (e.g. file objects) in a key-value store, so that any object may be looked up using a unique key. The object storage service may be configured to transparently perform certain storage tasks such as data backup, data replication, data recovery, etc. In some embodiments, the certificates repository may be used to store all of the latest certificates that are pinned in the application 130, so that an instance of the application updater 132 can retrieve any of the pinned certificates as needed. In some embodiments, the certificates repository 260 may store information that preserve the relationship of the certificates, for example, to link together certificates that are part of a chain of trust. In some embodiments, the certificates repository 260 may be used to store many certificates for many different types of applications.

Figure 3:
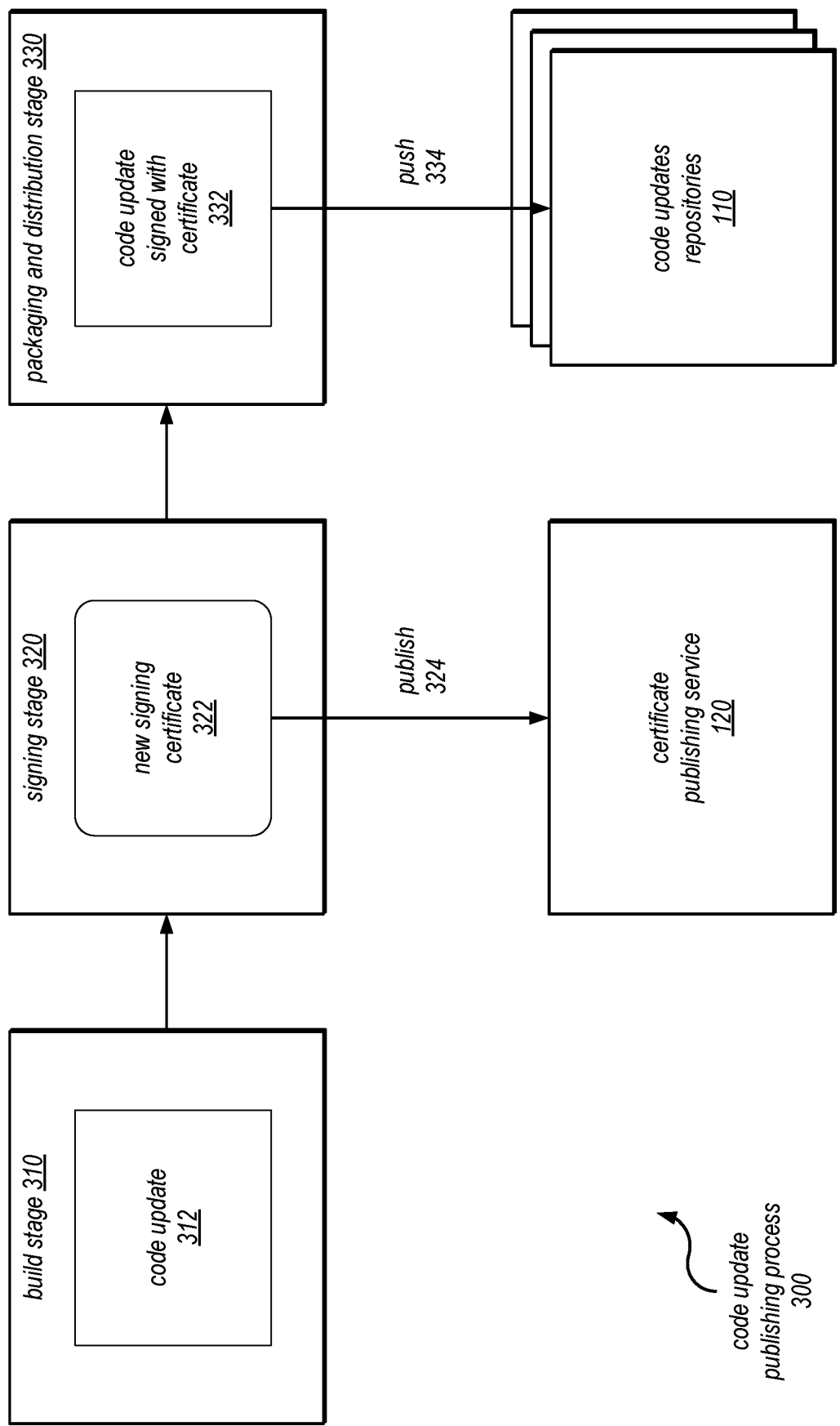
FIG. 3 illustrates a code update publishing process that publishes a code signing certificate to a certificate publishing service, according to some embodiments.

FIG. 3 illustrates a code update publishing process that publishes a code signing certificate to a certificate publishing service, according to some embodiments. In some embodiments, the depicted process may be used to push code updates 112 to the application 130.

As shown, the process 300 includes a number of stages 310, 320, and 330. In some embodiments, these stages may be controlled by different teams. However, because the signing certificate and the code updates will be pushed to the application in a decoupled fashion, the different teams may operate largely independently without having to coordinate over the signing certificate.

At the build stage 310, the code update 312 is built. In some embodiments, the code update 312 may be compiled into a binary installation package. In some embodiments, the build stage may be controlled by a release team that is responsible for creating new releases of the application.

As shown, the process next proceeds to a signing stage 320. In this example, a new signing certificate 322 is used to sign the code update 312. During this stage, the signing certificate 322 may be published 324 to the certificate publishing service 120, so that it can be retrieved by the application updater. In some embodiments, the signing stage 320 may be controlled by a different team from the build stage team. In some embodiments, the new signing certificate 322 may be pre-published to the certificate publishing service 120, and the new certificate is downloaded from the certificate publishing service in order to perform the signing. In some embodiments, the certificate publishing service 120 may hold multiple certificates available for download. For example, in some embodiments, the service may be configured to hold both the old code signing certificate and the new code signing certificate. In this manner, the service may be used to support different types of application updaters and/or code update push processes, which may use different code signing certificates.

As shown, the process then proceeds to a packaging and distribution stage 330. At this stage, the signed code update 332 is pushed 334 to various code update repositories 110 (e.g. repositories in different geographic regions). In some embodiments, the pushed package will not include the signing certificate 322 separate from the code update. Thus, the team that is responsible for stage 330 does not have to coordinate with the signing stage team in order to include a copy of the correct signing certificate 322 in the code update package. Rather, the signing certificate 322 is provided to the application updater via the certificate publishing service 120.

Figure 4:
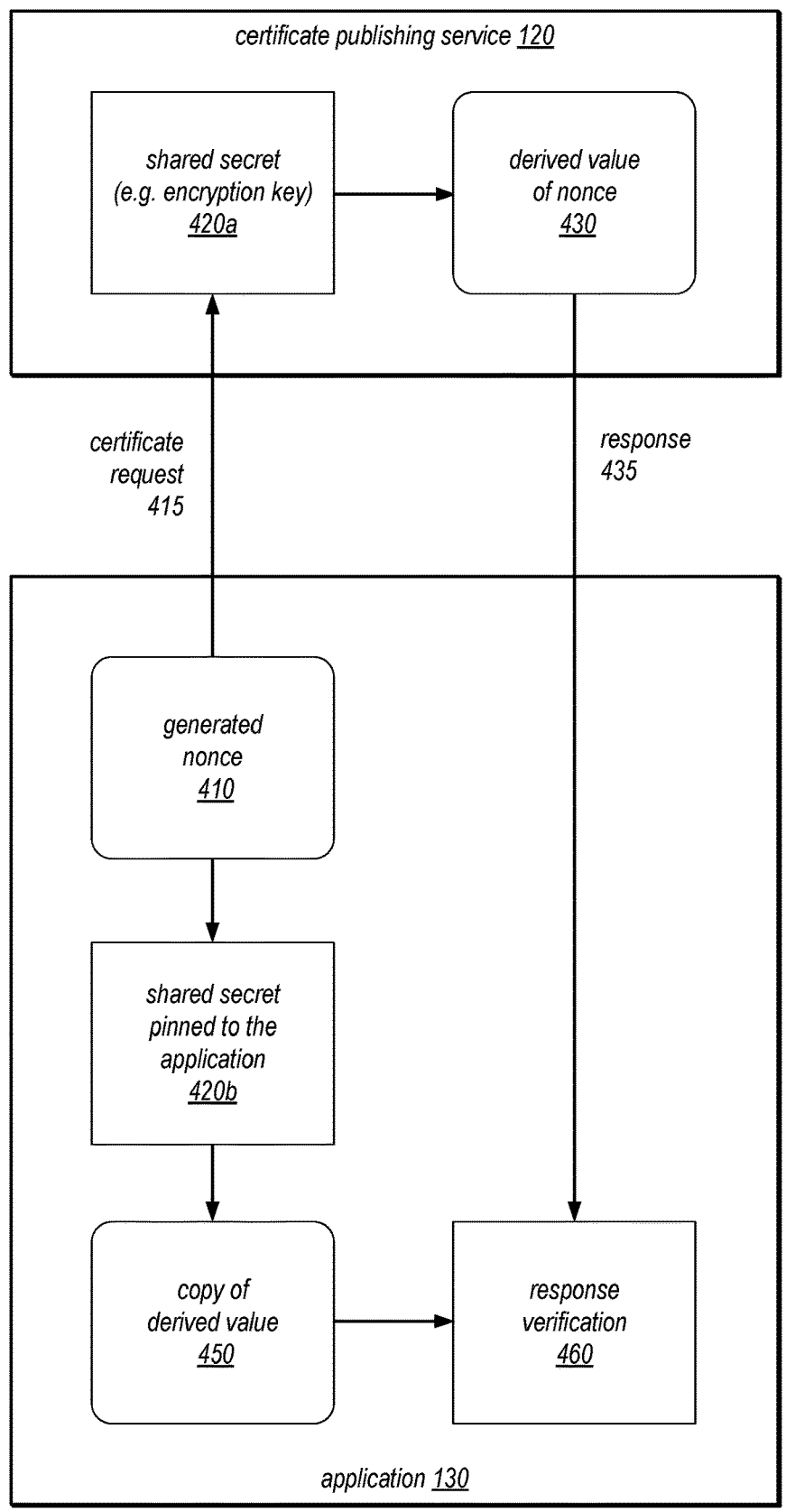
FIG. 4 illustrates the use of a nonce to verify a response from a certificate publishing service, according to some embodiments.

FIG. 4 illustrates the use of a nonce to verify a response from a certificate publishing service, according to some embodiments.

As shown, the application 130 sends a certificate request 415 to the certificate publishing service 120 to retrieve a signing certificate. In this example, the application 130 generates a nonce 410 and sends the nonce along with the request 415. In some embodiments, the nonce 410 may be generated randomly. In some embodiments, the nonce may be generated based on other runtime values such as a current timestamp, a unique identifier of the application, and the like.

As shown, the certificate publishing service will provide the response 435, which will include the requested certificate. In addition, the service 120 uses a shared secret 420$a$ known to the application 130 to generate a derived value 430 of the nonce. In some embodiments, the shared secret 420 may be a key (e.g. an encryption or decryption key) that is used to produce an encrypted or decrypted value of the nonce as the derived value 430. The key may be a symmetric key or one key in a pair of asymmetric keys. In some embodiments, the shared secret 420 be a hash generator, a checksum generator, or a random value generator, which generates a unique value from the nonce with high probability. This derived value 430 may be included as part of the response 435 back to the application 130.

As shown, the application 130 will then use the derived value 430 to verify the response 435. In some embodiments, the application will use its own copy of the shared secret 420$b$, which is pinned to the application, to regenerate another copy 450 of the derived value. Because the shared secret 420$b$ for generating the derived value is the same as the shared secret 420$a$ used by the certificate publishing service 120, the copy 450 of the derived value should match the received derived value 430. In some embodiments, the response verification module 460 may compare the two derived values to check that they are the same. If so, the response is verified and the downloaded certificate will be used. If not, the downloaded certificate will not be used and an error is reported. By performing this type of verification using a pinned shared secret, communications between the application 130 and the certificate publishing service 120 can be protected from certain types of hijacking attacks, for example, where a malicious middleman impersonates the certificate publishing service to present a false certificate to the application.

Figure 5:
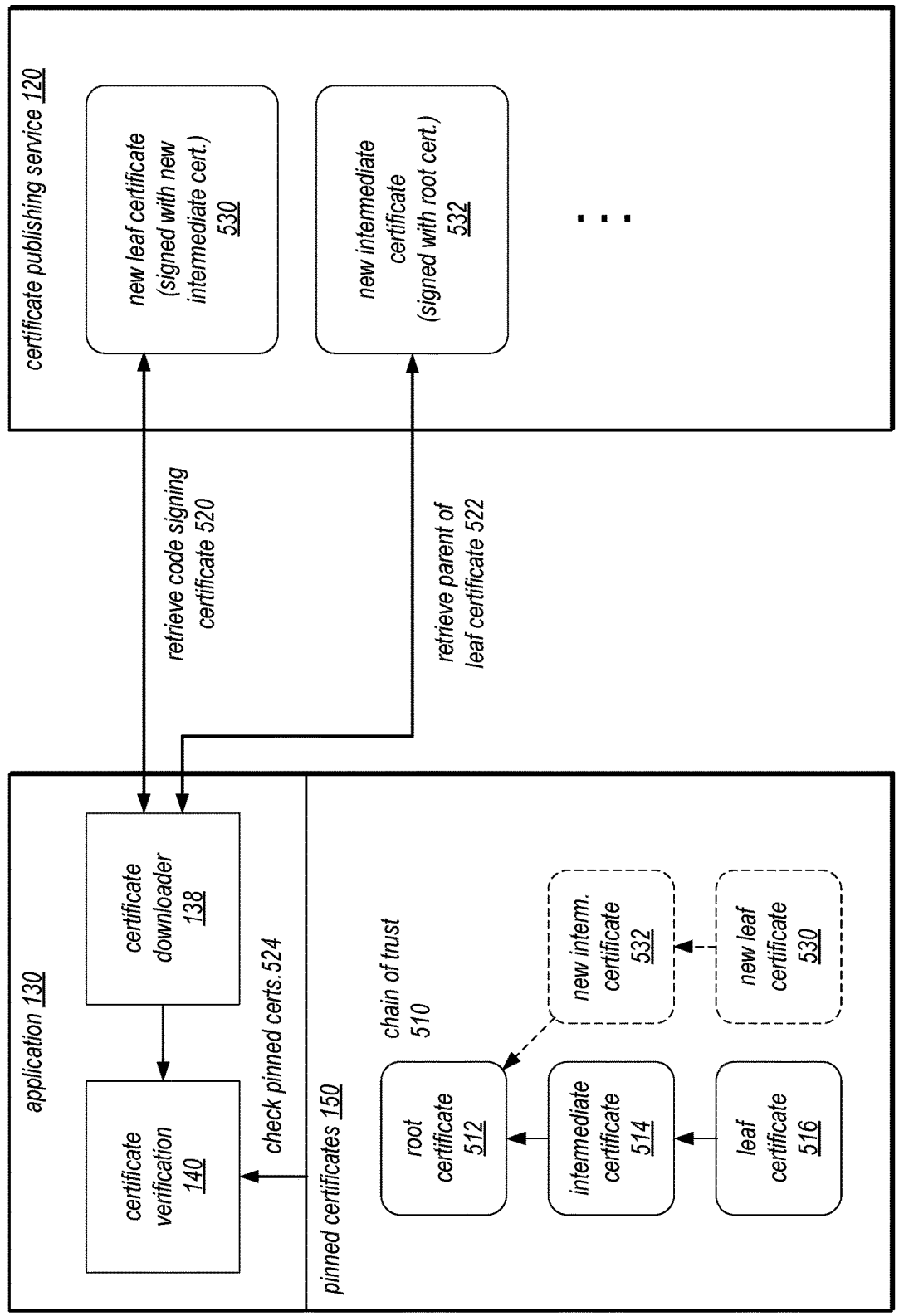
FIG. 5 illustrates a process of verifying a new code signing certificate using other pinned certificates in a chain of trust.

FIG. 5 illustrates a process of verifying a new code signing certificate using other pinned certificates in a chain of trust.

As shown in this example, application 130 includes a number of pinned certificates (certificates 512, 514, and 516) that are related to one another in a chain of trust. In such a chain, each certificate in the chain may be signed by a higher certificate in the chain, so that the authenticity of each certificate is verified by its parent certificate in the chain. As shown in this example, the leaf certificate 516 is verified by the intermediate certificate 514, which is in turn verified by the root certificate 512. In some embodiments, the root certificate may be trusted by the application without a parent certificate (e.g. where the root certificate is well known to be associated with an entity such as a certificate authority). In some embodiments, these pinned certificates 150 may be used by the application updater 132 to verify new certificates (e.g. certificates 530 and 532).

The figure depicts a situation where some of the pinned certificates are changed. In this example, the intermediate certificate 514 and leaf certificate 516 are replaced by a new intermediate certificate 532 and new leaf certificate 530. The new leaf certificate may be used to sign a new code update received by the application 130. As discussed, when the application updater discovers that the code update is signed by an unknown certificate, it will use the certificate downloader 138 to retrieve 520 the new leaf certificate.

As shown, the new leaf certificate is signed using the new intermediate certificate 532. When the application updater attempts to verify the new leaf certificate, the certificate verification module 140 may check 524 its pinned certificates 150 for a certificate that can verify the new leaf certificate. However, the new intermediate certificate 532 is not one of the pinned certificates. Accordingly, in some embodiments, the application updater will perform a second retrieval operation 522 to download the parent of the leaf certificate (the new intermediate certificate 532). In this example, the new intermediate certificate 532 is verified using the root certificate 512 pinned in the application. The new intermediate certificate 532 may then be used to verify the new leaf certificate 530, which may in turn be used to verify the code update. When the code update is applied, both of the new certificates 530 and 532 will be pinned to the application, so that subsequent code updates may be verified using the pinned leaf certificate 530. In some embodiments, the application updater may attempt to verify a new certificate by repeatedly retrieving higher certificates in the chain of trust 510 until a new certificate can be linked to a known certificate trusted by the application.

Figure 6A:
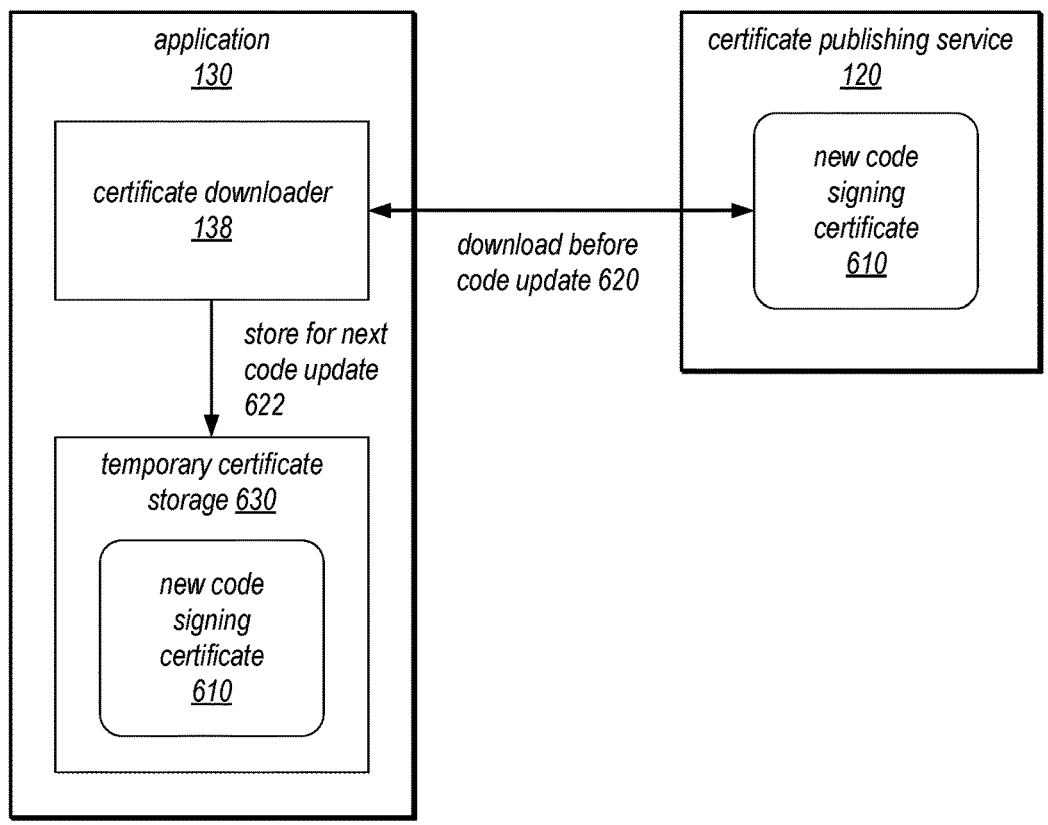
FIGS. 6A and 6B illustrate variations of the certificate downloading that may be implemented in an application updater to download new code signing certificates, according to some embodiments.
Figure 6B:
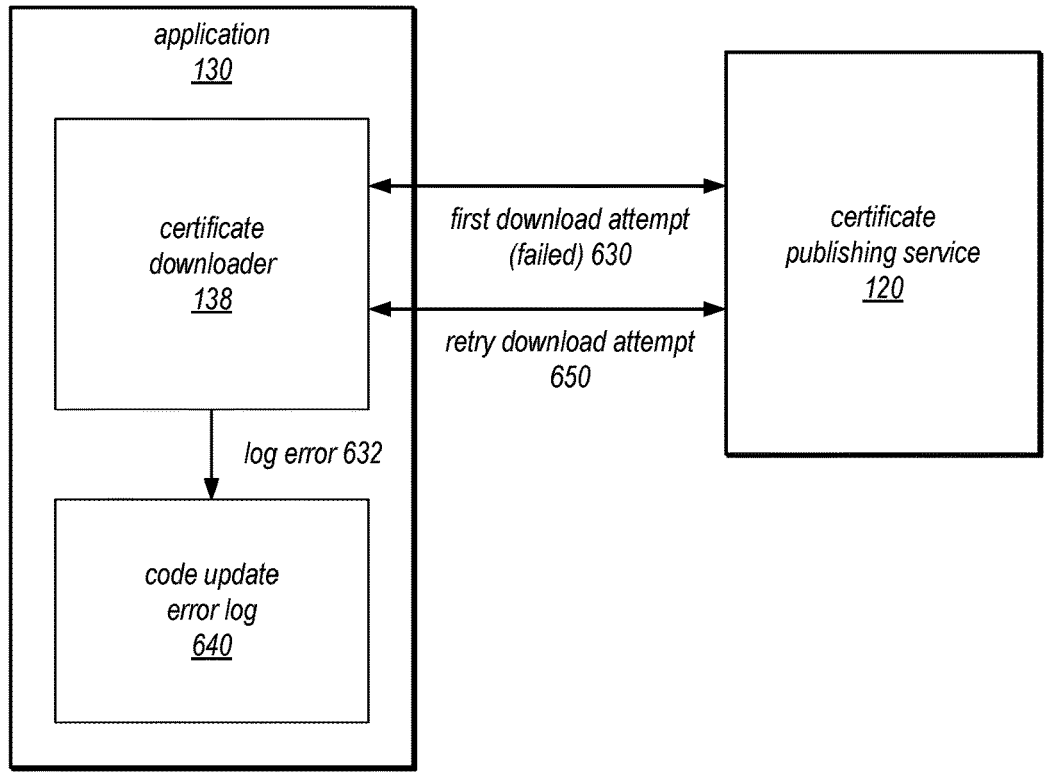

FIGS. 6A and 6B illustrate variations of the certificate downloading that may be implemented in an application updater to download new code signing certificates, according to some embodiments.

FIG. 6A illustrates an embodiment of application 130 that implements a certificate downloader 136 configured to download a new code signing certificate 610 from the certificate publishing service 120, before any code updates are received. This pre-downloading of a new code signing certificate is possible because of the decoupling of code updates and the code signing certificates. Advantageously, the pre-downloading of the new certificate simplifies the actual code update process and allows the update process to be completed more quickly. In some embodiments, the certificate downloader 138 may periodically check with the certificate publishing service 120 to determine if there are new code signing certificates to be downloaded. In some embodiments, the certificate publishing service may push the new code signing certificate to the application or issue a notification to the application that a new certificate is available for download.

As shown, once the new certificate 610 is downloaded the application may store 622 the certificate in a temporary certificate storage 630 to be used for the next code update verification. In some embodiments, the downloaded certificate may be verified before it is stored. In some embodiments, the stored certificate 610 may be erased after it is confirmed that the certificate has been pinned to the application.

FIG. 6B illustrates another embodiment of the application 130, where the certificate downloader 138 is configured to make multiple attempts to download new certificates from the certificate publishing service 120. As shown in this example, the certificate downloader 138 makes a first download attempt 630 to download a new certificate from the service 120, and that attempt fails. For example, the failure may be due to an unresponsive service 120, an incorrect certificate, or an unavailable certificate, etc. As a result, the certificate downloader may log 632 an error in a code update error log 640. However, the certificate downloader 138 will then make a retry attempt 650 to download the new certificate again. In some embodiments, the certificate downloader 138 may wait some time (e.g. until a next wakeup cycle of the application updater) to make the retry attempt 650. In some embodiments, the certificate downloader 138 may make repeated attempts to download a needed certificate until a maximum number of attempts have been made.

Figure 7:
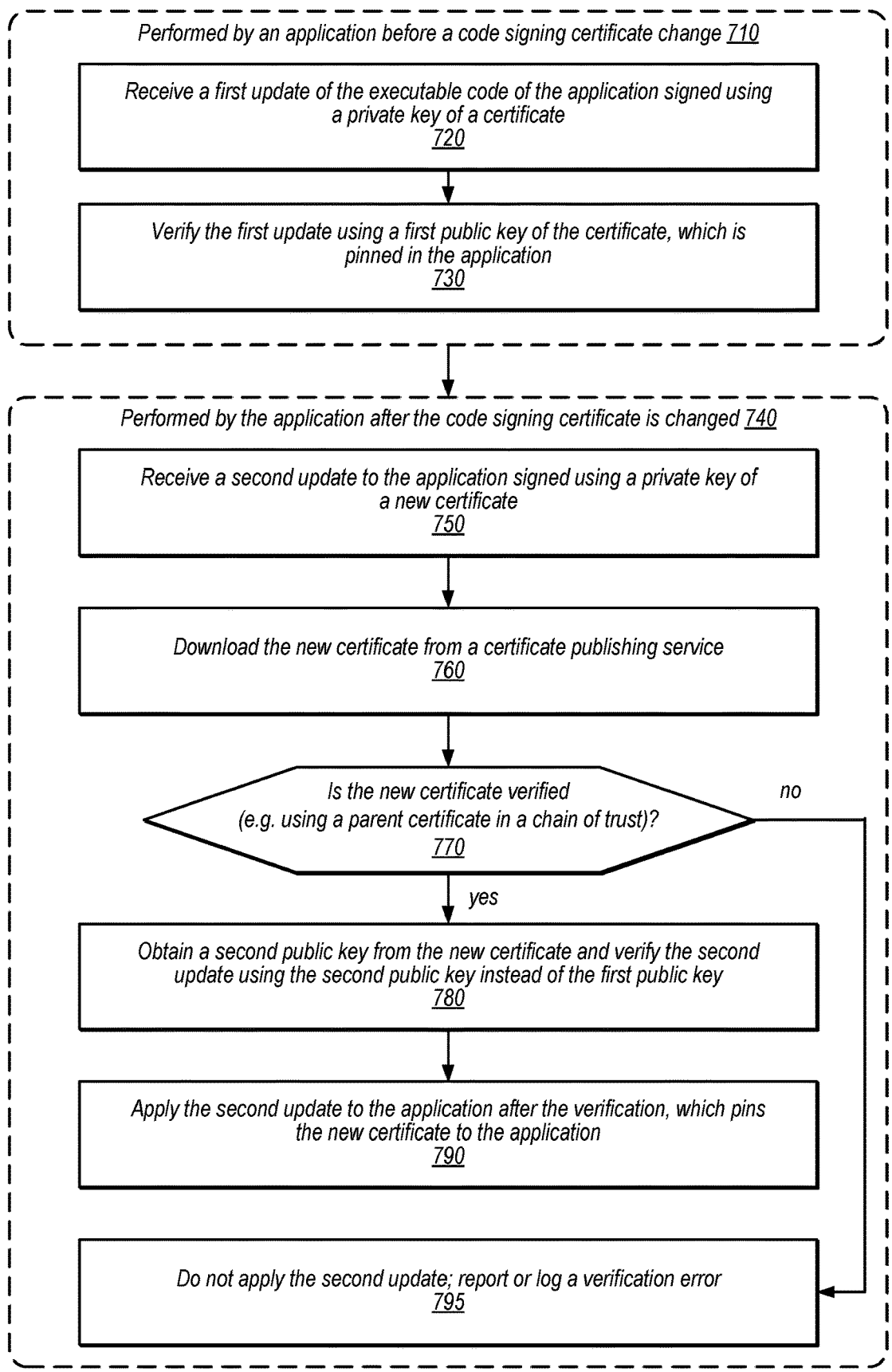
FIG. 7 is a flowchart illustrating a process of an application applying a code update signed using a new code signing certificate, according to some embodiments.

FIG. 7 is a flowchart illustrating a process of an application applying a code update signed using a new code signing certificate, according to some embodiments. In some embodiments, the depicted process may be performed by an embodiment of application update 132, as discussed in connection with FIG. 1.

As shown, operations 720 and 730 are performed 710 by an application (e.g. application 130) prior to a code signing certificate change. As discussed, the application may use certificate pinning to pin a code signing certificate in its executable code. When that code signing certificate has not changed, the pinned certificate may be used to verify all code updates downloaded from an update provider.

Accordingly, at operation 720, a first update of the application's executable code is received, which is signed using a private key of the certificate. In some embodiments, the code update may be downloaded from a code update repository (e.g. code update repository 110). In some embodiments, the code update may be pushed to the application via an API or some other data push mechanism.

At operation 730, the first update is verified using the public key of the pinned certificate. If the code update can be verified, it means that the code update is sent from a trusted source associated with the certificate, and that the code update has not been altered since the signing. If verification is successful, the code update may be applied to the application.

As shown, operations 750, 760, 770, 780, 790, and 795 are performed 740 after the code signing certificate is changed. In some embodiments, the change may occur due to the expiration of the original certificate, or a certificate rotation policy implemented by the certificate owner.

At operation 750, a second update (e.g. code update 112) is received by the application. The second update is signed using the private key of a new certificate (e.g. new certificate 122 of FIG. 1). As discussed, this new certificate is not pinned to the application. In some embodiments, the application updater may determine that it does not have the new certificate by confirming that none of the public keys associated with its pinned certificates can be used to verify the second update. In some embodiments operation 750 may be performed by the update downloader module 134 of FIG. 1.

At operation 760, the application updater downloads the new certificate from a certificate publishing service (e.g. certificate publishing service 120 of FIG. 1). In some embodiments, the downloading may be performed by sending a download request to the certificate publishing service according to the service interface, and then receiving the requested certificate from the service. In some embodiments, the certificate publishing service may be implemented on top of computing resource services provided by a service provider network (e.g. service provider network 230 of FIG. 2A). In some embodiments, operation 760 may be performed by the certificate downloader module 138 of FIG. 1.

At operation 770, a verification of the new certificate is attempted. In some embodiments, the new certificate may be verified using other certificates in a chain of trust (e.g. chain of trust 510 of FIG. 5). For example, the new certificate may be signed by a higher certificate in the chain of trust, which may be pinned to the application. The signature may be verified by the application using the higher certificate pinned in its code. In some embodiments, the application updater may attempt to download successively higher certificates in the chain from the certificate publishing service, and verify these certificates until the chain of trust can be linked to a trusted certificate known to the application. In some embodiments, operation 770 may be performed by the certificate verification module 140 of FIG. 1.

If the new certificate is verified, the process proceeds to operation 780, where a second public key is obtained from the new certificate and the second update is verified using the second public key instead of the first public key that is pinned to the application. In some embodiments, this verification of the second update may occur in similar fashion as in operation 730. In some embodiments, operation 780 may be performed by the update verification module 142 of FIG. 1.

If the second code update is verified, at operation 790, the second update is applied to the application. Applying the second update will cause the new certificate to be pinned to the application. In this way, future code updates can be verified using the pinned new certificate. In some embodiments, the second update is provided as an executable, and applying the second update may be accomplished by executing the second update. In some embodiments, operation 790 may be performed by the update installation module 144 of FIG. 1.

If the new certificate cannot be verified at operation 770, the process proceeds to operation 795. At operation 795, the unverified second update is not applied to the application. Instead, a verification error is recorded in an error log. In some embodiments, the reported or logged error may be examined by an engineer to determine the root cause of the verification failure (e.g. whether the error was the result of a malicious update provided by an attacker).

Figure 8:
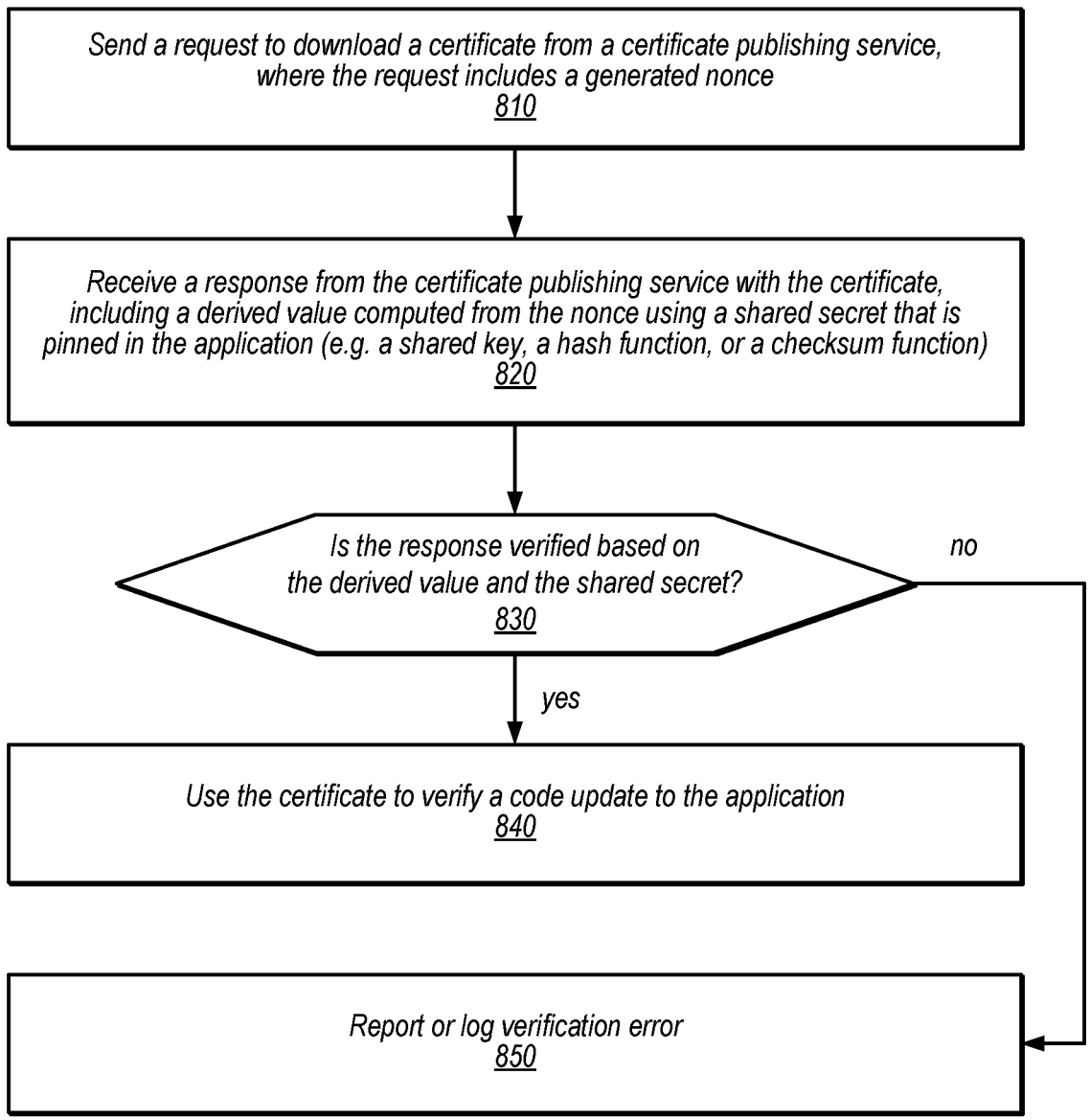
FIG. 8 is a flowchart illustrating a process of verifying a response from a certificate publishing service using a generated nonce, according to some embodiments.

FIG. 8 is a flowchart illustrating a process of verifying a response from a certificate publishing service using a generated nonce, according to some embodiments. In some embodiments, the depicted process may be performed by the application updater 132 of FIG. 1 and/or in a similar fashion as discussed in connection with FIG. 4.

The process begins at operation 810, where a request to download a certificate is sent to a certificate publishing service (e.g. the certificate publishing service 120). The request (e.g. certificate request 415) includes a generated nonce (e.g. nonce 410). In some embodiments, the nonce may be a randomly generated value. In some embodiments, the nonce may be generated based on runtime values such as a current timestamp, the application's unique identifier, etc.

At operation 820, a response is received from the certificate publishing service. The response (e.g. response 435)

includes a derived value (e.g. derived value 430) computed from the nonce and using a shared secret (e.g. shared secret 420), which may be pinned in the application. In some embodiments, the shared secret may be an encryption or decryption key, and the derived value may be an encryption or decryption of the nonce. In some embodiments, the key may be a symmetric key held by both the application and the service. In some embodiments, the application and the service may hold counterparts of a public-private key pair. In some embodiments, the shared secret may be a hash function, checksum function, or random number generator function that is known to both the application and the service. Accordingly, the derived value may be a hash, checksum, or random value generated from the nonce.

At operation 830, the application performs a check to determine whether the response is verified, based on the derived value and the shared secret. In some embodiments, the verification may involve the application regenerating its own copy of the derived value from the nonce, using its own copy of the shared secret (e.g. shared secret 420b), which may be pinned in the application. The two copies of the derived value are then compared to determine if the response was actually sent by the certificate publishing service. In some embodiments, the application may perform the reverse operation as the service, to regenerate the nonce from the derived value. In that case, the verification will succeed if the regenerated nonce value matches the original nonce value.

If the verification succeeds, the process proceeds to operation 840, where the certificate received from the certificate publishing service is used to verify a code update to the application. Operation 840 may be performed in a similar manner as discussed in connection with operations 770 and 780 of FIG. 7. On the other hand, if the verification does not succeed, the application may report or log a verification error. The error will indicate that the certificate publishing service generated a response that failed to provide an expected derived value for the nonce. The error may be examined by a human engineer to determine the reason for the failure.

Figure 9:
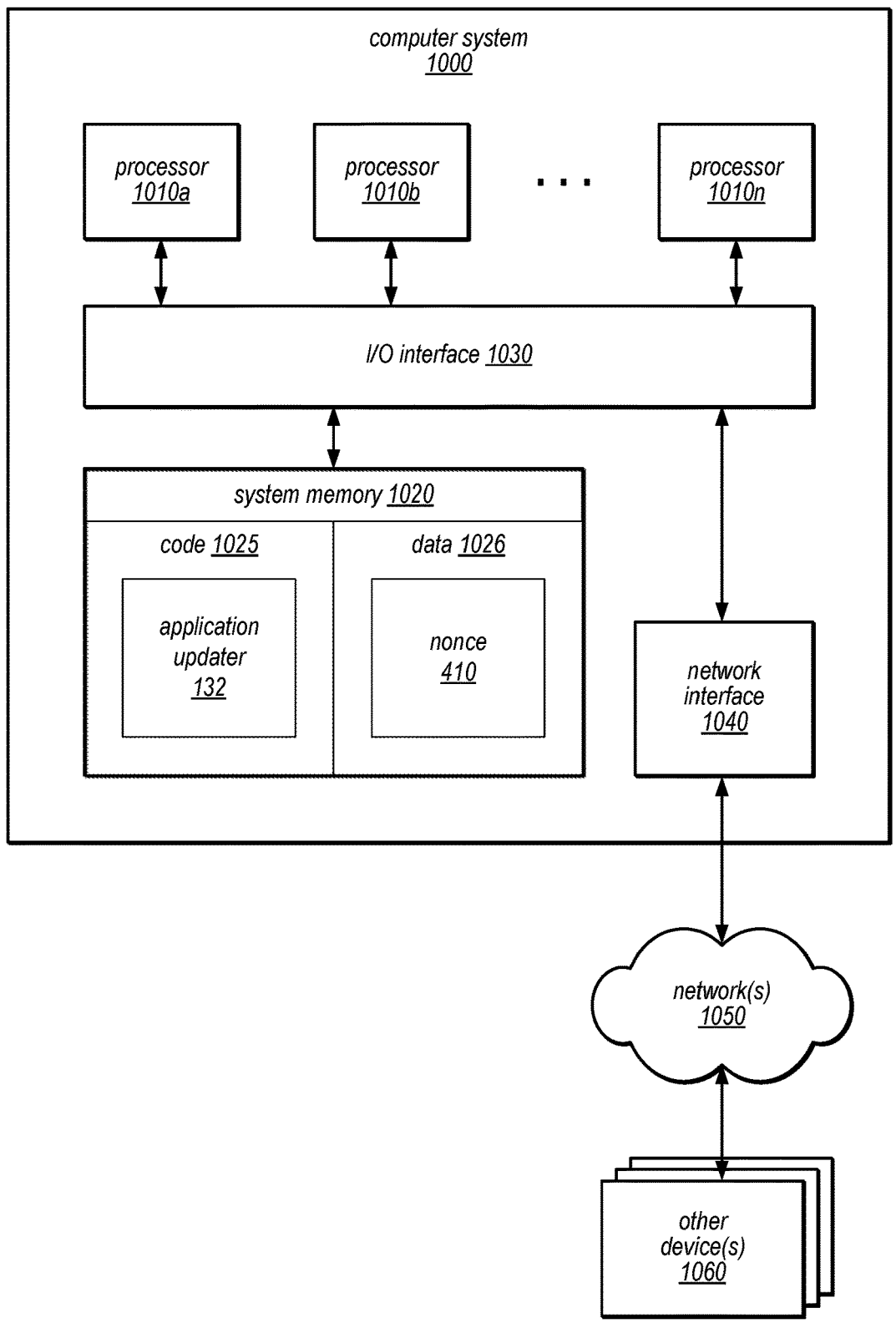
FIG. 9 is a block diagram illustrating an example computer system that can be used to implement one or more portions of an application that downloads new certificates from a certificate publishing service to verify code updates or the certificate publish service that can be used to securely provide new code signing certificates to the application, according to some embodiments.

FIG. 9 is a block diagram illustrating an example computer system that can be used to implement one or more portions of an application that downloads new certificates from a certificate publishing service to verify code updates or the certificate publish service that can be used to securely provide new code signing certificates to the application, according to some embodiments.

The depicted computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. As shown, computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the systems described herein.

In the illustrated embodiment, computer system 1000 also includes one or more other devices 1060, which may include persistent storage devices and/or I/O devices. In various embodiments, persistent storage devices may correspond to disk drives, tape drives, solid state memory, other mass storage devices, or any other persistent storage device. Computer system 1000 (or a distributed application or operating system operating thereon) may store instructions and/or data in persistent storage devices, as desired, and may retrieve the stored instruction and/or data as needed. For example, in some embodiments, computer system 1000 may implement a node of the Boolean query evaluation system disclosed herein.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions or code 1025 may include instructions executable to implement executable components of the application 130, such as the application updater 132. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040. In some embodiments, system memory 1020 may include data store 1026, which may be configured as described herein. For example, the information stored in the data store may include the nonce 410 used to securely download new code signing certificates.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems. In addition, network interface 1040 may allow communication between computer system 1000 and various other devices 1060, such as I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more hardware processors with associated memory that implement an application, configured to:
receive a first update to executable code of the application, wherein the first update is signed using a private key associated with a certificate, and in response:
verify the first update using a first public key associated with the certificate that is pinned in the executable code of the application; and
apply the first update to the executable code of the application;
receive a second update to the executable code of the application, wherein the second update is signed using another private key associated with a new certificate, and in response:
download the new certificate from a certificate publishing service;
obtain a second public key from the new certificate;
verify the second update using the second public key instead of the first public key; and
apply the second update to the executable code of the application after the verification, wherein the second update pins the new certificate in the executable code of the application.

2. The system of claim 1, wherein the application is configured to verify the new certificate as authentic before using the second public key to verify the second update.

3. The system of claim 1, wherein to download the new certificate, the application is configured to:
send a request to the certificate publishing service, wherein the request includes a generated nonce;
receive a response from the certificate publishing service with the new certificate, wherein the response includes a derived value computed from the nonce using a shared secret that is pinned in the application; and
verify the response based on the derived value and the shared secret.

4. The system of claim 1, wherein:
the application is deployed on a virtual machine hosted in a service provider network that hosts virtual machines on behalf of different clients;
the application is configured to provide data about the virtual machine to one or more virtual machine inspection services of the service provider network; and
the application is configured to periodically check for code updates from a storage location in the service provider network.

5. The system of claim 4, wherein:
the certificate publishing service is implemented by the service provider network, and includes:
a service interface implemented by an interface gateway service of the service provider network,
one or more task execution nodes implemented by an event-driven task execution service of the service provider network, and
a certificate repository implemented by a storage service of the service provider network.

6. A method, comprising:
performing, by an application implemented on one or more hardware processors with associated memory:

applying a first update to an executable code of the application, wherein the first update is verified using a first public key of a certificate pinned in the executable code of the application;

receiving a second update to the executable code of the application, wherein the second update is signed using a private key associated with a new certificate;

downloading the new certificate from a certificate publishing service;

verifying the second update using a second public key obtained from the new certificate instead of the first public key; and applying the second update to the executable code of the application after the verification, wherein the second update pins the new certificate in the executable code of the application.

7. The method of claim 6, further comprising verifying, by the application, the new certificate as authentic before using the second public key to verify the second update.

8. The method of claim 7, wherein the verifying of the new certificate comprises:

determining that the new certificate is signed by another certificate in a chain of trust of the new certificate, wherein the other certificate is pinned in the executable code of the application.

9. The method of claim 7, wherein the verifying of the new certificate comprises:

downloading another certificate from the certificate publishing service, wherein the other certificate is in a chain of trust of the new certificate; and determining that the new certificate is signed using another key associated with the other certificate.

10. The method of claim 6, further comprising performing, by the application:

receiving a user input indicating to update the application; and in response to the user input, downloading the second update from a code updates repository.

11. The method of claim 6, wherein:

the application is deployed on a virtual machine hosted in a service provider network that hosts virtual machines on behalf of different clients; and the method further comprises providing, by the application, data about the virtual machine to one or more virtual machine inspection services of the service provider network.

12. The method of claim 6, wherein the downloading of the new certificate comprises:

sending a request to the certificate publishing service, wherein the request includes a generated nonce;

receiving a response from the certificate publishing service with the new certificate, wherein the response includes a derived value computed from the nonce using a shared secret that is pinned in the application; and verifying the response based on the derived value and the shared secret.

13. The method of claim 12, wherein the shared secret is a symmetric key and the verifying of the response comprises:

generating a second derived value using the symmetric key; and determining that the derived value matches the second derived value.

14. The method of claim 6, wherein the downloading of the new certificate is performed before receiving of the second update and in response to a determination that the new certificate is available at the certificate publishing service.

15. One or more non-transitory computer-accessible storage media storing program instructions that when executed on or across one or more processors implement an application and cause the application to:

apply a first update to an executable code of the application, wherein the first update is verified using a first public key of a certificate pinned in the executable code of the application;

receive a second update to the executable code of the application, wherein the second update is signed using a private key associated with a new certificate;

download the new certificate from a certificate publishing service;

verify the second update using a second public key obtained from the new certificate instead of the first public key; and apply the second update to the executable code of the application after the verification, wherein the second update pins the new certificate in the executable code of the application.

16. The one or more non-transitory computer-accessible storage media of claim 15, wherein the program instructions when executed on or across the one or more processors cause the application to verify the new certificate as authentic before using the second public key to verify the second update.

17. The one or more non-transitory computer-accessible storage media of claim 16, wherein to verify the new certificate, the program instructions when executed on or across the one or more processors cause the application to:

determine that the new certificate is signed by another certificate in a chain of trust of the new certificate, wherein the other certificate is pinned in the executable code of the application.

18. The one or more non-transitory computer-accessible storage media of claim 16, wherein to verify the new certificate, the program instructions when executed on or across the one or more processors cause the application to:

download another certificate from the certificate publishing service, wherein the other certificate is in a chain of trust of the new certificate; and determine that the new certificate is signed using another key associated with the other certificate.

19. The one or more non-transitory computer-accessible storage media of claim 15, wherein to download the new certificate, the program instructions when executed on or across the one or more processors cause the application to:

send a request to the certificate publishing service, wherein the request includes a generated nonce;

receive a response from the certificate publishing service with the new certificate, wherein the response includes a derived value computed from the nonce using a shared secret that is pinned in the application; and verify the response based on the derived value and the shared secret.

20. The one or more non-transitory computer-accessible storage media of claim 19, wherein the program instructions when executed on or across the one or more processors cause the application to decrypt the encrypted value using a symmetric key shared between the application and the certificate publishing service.

* * * * *